Nov. 19, 1929.   E. B. WILFORD   1,736,299
AIRCRAFT
Original Filed Dec. 4, 1925   2 Sheets-Sheet 1
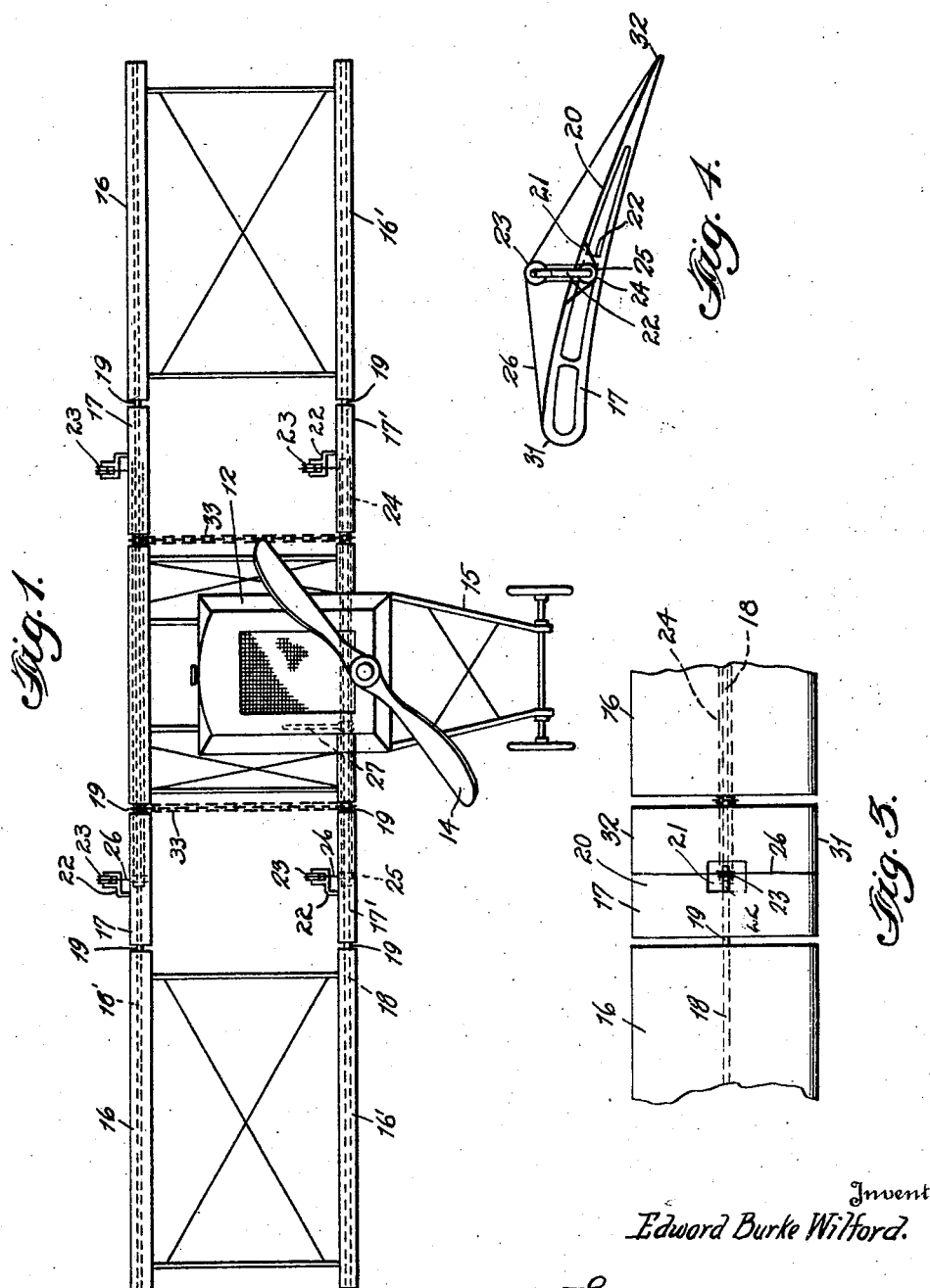
Inventor
Edward Burke Wilford.
By Frank H. Borden
Attorney

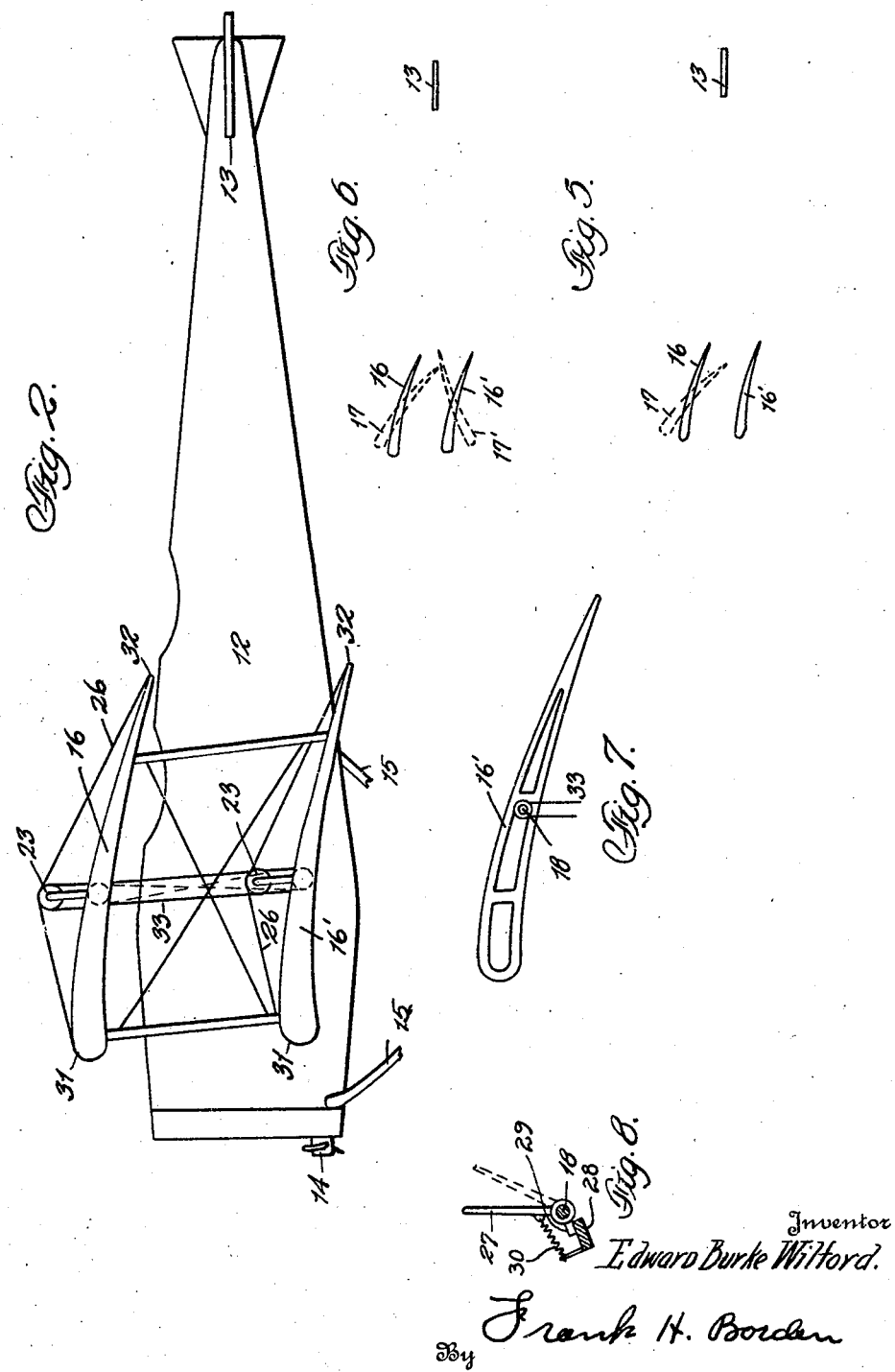

Patented Nov. 19, 1929

1,736,299

UNITED STATES PATENT OFFICE

EDWARD BURKE WILFORD, OF MERION, PENNSYLVANIA

AIRCRAFT

Application filed December 4, 1925, Serial No. 73,174. Renewed September 16, 1929.

My invention relates to aircraft, pertaining particularly to means for varying the longitudinal dihedral angle of an airplane during flight.

There are many situations in which it is desirable to change the angle between the chord of a wing and the longitudinal axis of an airplane, known as the longitudinal dihedral angle, during flight. In "taking off," for instance, in airplanes now in use, in which the dihedral angle is predetermined and set to attain the highest possible speed in flight, the lift component is sacrificed so that it is necessary for the airplane to run for a great distance over the ground before taking off. If the dihedral angle were variable it would be possible to "take off" with a much smaller run, by an increase in the dihedral angle to that at which the greatest lift is derived.

Obviously after full flight is attained it is desirable to decrease the dihedral again to that angle at which the greatest speed is attained, as the forward speed is increased as the lift and associated drift are decreased, as is well known. In making a landing, or in air traffic, variation of the dihedral, under the control of the pilot enables him to increase materially the drift on the wing so as to retard the flight of the plane, thus imparting a braking action thereto. It is frequently desirable in braking to increase the lift with the drift in order to maintain a given altitude, or even to climb during the braking operation.

With these several desiderata in mind it is an object of my invention to provide in an airplane, means for varying the longitudinal dihedral angle thereof, under the control of the pilot.

It is a further object of my invention to provide an airplane and means for varying the inclination of at least a portion of the wings, to increase the lift thereof.

It is a further object of my invention to provide an airplane having a supporting wing so arranged that the lift thereof may be varied in flight.

It is a further object of my invention to provide an airplane having means for braking the airplane without a loss of altitude.

Another object of my invention is to provide in an airplane means for increasing the lift in flight without affecting the horizontal stability thereof.

Many other objects and advantages will be apparent upon perusal of the following description taken in connection with the attached drawings.

In carrying out my invention I provide in the preferred form an airplane having a supporting wing, and means for varying the inclination of at least a portion of said wing, thus varying the longitudinal dihedral angle and affecting the lift of said wing or wing section.

In order to maintain the horizontal stability of the airplane I may also provide wings, a section of which or the entire wing is pivotally mounted for oscillation, the pivot being vertically in substantial alinement with the center of gravity or with the lateral axis passing therethrough.

In the accompanying drawings:

Fig. 1, is a front elevation of a biplane showing each wing with an oscillatable portion or section, Fig. 2, is a side elevation of the same, Fig. 3, is a view from above of the pivoted section, showing one form of operating mechanism, Fig. 4, is a vertical section through a wing to show one form of mounting therefor and one form of operating mechanism, such as is shown in Fig. 3, Fig. 5, is a diagrammatic section illustrating the wind currents when the section is oscillated and the lift increased as when "taking off", Fig. 6, is a diagrammatic section illustrating the position of sections of wings in a biplane when they are oscillated in different directions to form a pocket or trap, with a tremendous increase in drift, Fig. 7, is a vertical section through a modified form of wing section imposing a minimum of wind resistance, and Fig. 8, is a detail of the resilient connection normally maintaining the section in its proper flying attitude and at the predetermined longitudinal dihedral angle.

It will be understood that it is within the scope of my invention to provide an airplane in which the entire wing is pivotally mounted for oscillation under the control of the pilot to obtain the desired results. As in most cases however, it will suffice to provide one or more pivoted sections in an otherwise stationary wing, the description will be limited to such sections for the sake of brevity; the principle involved being the same in any case.

The airplane fuselage 12, carries the horizontal stabilizing fin 13, propeller 14, and landing carriage or pontoons (not shown), 15. The invention is applicable to airplanes, or hydroplanes, and to monoplanes, or biplanes, although illustrated as applied to a biplane. The wings 16 and 16' are affixed to the fuselage in any desired manner, and as indicated may be bodily pivoted thereto. In the wings 16 and 16', at desired points, sections 17 and 17' are pivotally mounted. The longitudinal dihedral angle of the airplane, that is the chord of the wing prolonged to intersect the longitudinal axis of the fuselage or the plane of the horizontal stabilizing fin, is predetermined and set in the rigging of the airplane, and is generally set at the most efficient flying angle. That is at the angle in which the greatest speed may be attained in full flight. This angle, although most efficient for full flight, is not efficient for either taking off or landing. It is well known in the art of rigging airplanes that an increase in the longitudinal dihedral angle of the airplane, results in an increased lift, although at a sacrifice of speed. It is contemplated that providing a section of a wing or the entire wing itself, pivoted for actuation by the pilot to vary the inclination thereof, will provide an increase in the dihedral angle sufficient to sharply increase the lift component for as long as desired, to enable the pilot to leave the ground or water with a very short run. Obviously this may be attained in a number of ways, one of which is shown for purposes of illustration.

The pivotal support for the sections 17 and 17' may be had in any desired manner, but I prefer to utilize a lateral spar member 18, which may, if desired, be tubular extending the length of the wing to support the wing elements. It may be extended through the fuselage if desired as shown in the lower wing of Fig. 1, in dotted lines. It is to be noted that the spar passes through each wing substantially in line vertically with the center of gravity of the airplane. It need not be so positioned unless desired, but I have found that using the spar as a pivot for the section to be oscillated, I am enabled to vary the inclination of the section without affecting the stability of the airplane on its lateral horizontal axis. To secure this result it is but necessary that the center of gravity be somewhere vertically below the section, between the entering and trailing edges, as this factor varies with the speed and climbing angle.

The sections are mounted on bearings 19, on the immovable spar 18, and the upper surface of the section 20, may be recessed as at 21 to permit oscillation about the horn or upstanding stud 22, carried by the spar 18. The stud or horn is bifurcated to receive the roller or pulley 23, and which is journaled for rotation. An oscillatable sleeve 24 is mounted on bearings (not shown), on said spar 18, and carries a gripping or drum section 25, and a chain or cable 26 fastened at the front or leading edge 31, down over the drum on the sleeve after passing over the roller 23, then up over the roller again and is fastened at or toward the trailing edge 32, of the section.

It will be apparent that oscillation of the sleeve on the stationary spar 18, will tighten the chain or cable on one side of the drum or gripping section, and by tension on the proper portion of the wing section, will cause oscillation of the wing or section to a desired extent, with a consequent change in its inclination relative the body, that is a change in the longitudinal dihedral angle, with a consequent change or variance of its lift and drift components.

Many modifications will occur to those skilled in the art, one of which I illustrate in Fig. 7, in which the wing section is fastened directly to the oscillatable sleeve and is moved therewith. This form has an advantage in that the wind resistance is minimized. The construction will be apparent without a detailed description.

For the operation of the device the sleeve may be prolonged to extend through the fuselage, and carry, at a convenient location a handle or similar device 27, within reach of the pilot. Movement of the handle 27 obviously will actuate the wing or section.

In the case of a biplane as shown, direct chain or gear connections 33 may be had between the sleeves of the upper and lower wings to cause them to oscillate together and in the same direction. If it is desired to move them in opposite directions so as to effect tremendous drift, with no appreciable lift, suitable reversing gear (not shown) may be installed to enable the pilot to swing the sleeves and associated wing sections in opposite directions, or the chains or gearing might be reversed as shown in dotted lines, in Fig 2

It is known that the dihedral angle should be between 2 and 4 degrees for the most efficient flight, although the wings are efficient in lift up to 15 degrees. At this angle the drift has also been tremendously increased which factor I utilize in slowing or retarding the speed of the plane while maintaining a given altitude, or even in climbing during braking action. If the angle is increased still further, the drift component increases out of all proportion to the lift derived and the braking action is increased without increase of lift, as for sudden stopping of flight in the air or in landing after the wheels of the landing carriage have made contact with the ground, (or pontoons with the water). In taking off when it is desired to obtain the greatest efficiency in lift, at low speeds, the pilot may swing the sections or the wings at such angles as will insure the best angle for greatest lift and will be enabled to take off with a very short run compared with the run customarily necessary with the present rigging of airplanes. Obviously, as this is within the control of the pilot, he will be able to achieve the greatest lift whenever desired, and can maintain this desirable angle of climb as long as desired.

Obviously it is not necessary that the pilot be compelled to retain a grasp on the handle 27 at all times, as means to keep the wing section in its normal flying position in registry with the remainder of the wing may be provided, as shown in Fig. 8, in which a stationary stop 28, is engaged by a lug 29 on the oscillatable sleeve and is normally held in this position by a resilient unit 30, as will be readily understood.

If desired, as previously mentioned and as shown diagrammatically in Fig. 6, I may oscillate opposed sections in opposite directions to form a pocket in which the air stream is trapped and which causes tremendous drag or drift and decelerates the flight.

It will be understood that the term "in flight" is intended to cover any condition of the plane in movement relative to the ground or water, whether taking off, full flight, or landing flight, and whether contact is still being made with the ground or not.

It should be noted that in pivoting the wing or wing section as shown, that the pressure on the section or wing is balanced. In other words, as the pivoting is between the entering edge and the trailing edge, the turning moments of the wing or section, being substantially balanced, little or no effort will be necessary to swing them to a desired position, or to return them to their normal flying position. Further, the movement of the wing or sections, may be had without effecting any change in the stability of the airplane, and without requiring compensating movements of the other control surfaces of the airplane.

As noted, although I have shown and described my invention as best illustrated by an airplane having pivoted sections of the wings, yet since similar results may be had by having the entire wing so arranged as to be adjustable, I wish both constructions to be considered in the scope of the following claim, except as they may be otherwise limited.

I claim as my invention:

In an airplane, a fuselage, a cylindrical spar extending laterally from the fuselage, a wing carried on the spar, a wing section pivotally mounted on the spar and having an opening, a horn mounted on the spar and extending through the opening in the section, a roller or pulley journaled in the horn, cable means extending over the roller and connected at the opposite edges of the wing section, a hollow sleeve concentrically journalled on the spar and terminating substantially in alignment with the roller and said opening in the section, means transmitting oscillations of the sleeve to the roller on the horn, and means in the fuselage for imparting oscillations to said sleeve.

In testimony whereof I affix my signature.

EDWARD BURKE WILFORD.